United States Patent
Weitzel et al.

(10) Patent No.: US 6,187,861 B1
(45) Date of Patent: Feb. 13, 2001

(54) PROCESS FOR PREPARING CROSSLINKABLE BINDERS

(75) Inventors: Hans-Peter Weitzel, Reischach; Harald Zeh, Burghausen, both of (DE)

(73) Assignee: Wacker Chemie GmbH, Munich (DE)

( * ) Notice: Under 35 U.S.C. 154(b), the term of this patent shall be extended for 0 days.

(21) Appl. No.: 09/285,622

(22) Filed: Apr. 3, 1999

(30) Foreign Application Priority Data

May 22, 1998 (DE) .............................................. 198 23 099

(51) Int. Cl.$^7$ ....................................................... C08L 29/04
(52) U.S. Cl. ........................... 524/803; 524/503; 524/522
(58) Field of Search .................... 524/803, 503, 524/522

(56) References Cited

U.S. PATENT DOCUMENTS

| 3,642,680 | 2/1972 | Jennings et al. . |
| 4,439,574 | 3/1984 | Schuppiser et al. . |
| 4,980,411 | 12/1990 | Beckerle et al. . |
| 5,262,278 | 11/1993 | Lauke et al. . |
| 5,314,936 | 5/1994 | Schwartz et al. . |
| 5,527,859 | 6/1996 | Kempter et al. . |
| 5,614,049 | 3/1997 | Kohlhammer et al. . |

FOREIGN PATENT DOCUMENTS

| 4318083 | 5/1994 | (DE) . |
| 324416 | 7/1989 | (EP) . |
| 421787 | 4/1991 | (EP) . |
| 441221 | 8/1991 | (EP) . |
| 499835 | 8/1992 | (EP) . |
| 522789 | 1/1993 | (EP) . |
| 565093 | 10/1993 | (EP) . |
| 602763 | 6/1994 | (EP) . |

OTHER PUBLICATIONS

Fox T. G., Bull. Am. Physics Soc. 1, 3, p. 123 (1956).
Polymer Handbook, 3$^{rd}$ Edition, J. Wiley & Sons., New York (1989).

*Primary Examiner*—Bernard Lipman
(74) *Attorney, Agent, or Firm*—Burgess, Ryan & Wayne; Milton J. Wayne; William R. Moran

(57) ABSTRACT

A process is provided for preparing crosslinkable binders in the form of the aqueous dispersions by polymerizing vinyl ester-olefin copolymers in the presence of protective colloid, which comprises polymerizing vinyl ester-olefin copolymers having a Tg of less than −10° C. by emulsion polymerization in the presence of a protective colloid based on (meth)acrylate polymers comprising from 80 to 95% by weight, based on the overall weight of the polymer, of acrylates or methacrylates of aliphatic alcohols of 1 to 12 carbon atoms and from 5 to 20% by weight, based on the overall weight of the copolymer, of ethylenically unsaturated monocarboxylic or dicarboxylic acids, the latter copolymer having a glass transition temperature Tg of from 60 to 120° C., and, after the end of polymerization, introducing the crosslinkable groups by reacting the carboxyl groups of the (meth)acrylate polymers with ethylenically unsaturated compounds comprising functions suitable for esterifying the carboxyl group.

13 Claims, No Drawings

PROCESS FOR PREPARING CROSSLINKABLE BINDERS

BACKGROUND OF THE INVENTION

1) Field of the Invention

The invention relates to a process for preparing crosslinkable binders and to the use of the vinyl ester-olefin copolymers obtainable therewith and stabilized with protective colloid as binders, in particular as binders for elastic coatings.

2) Background Art

Aqueous synthetic-resin dispersions and corresponding powders have for many years now been indispensable additives for application in the construction sector, especially for plasters, mortars, reinforcing compounds, self-leveling compounds, tile adhesives, paints, and integrated heat insulation systems. For high-grade plasters and paints, in particular, there is ever-increasing use of binders which give these products properties such as improved mechanical qualities, better weathering resistance, and a reduced soiling tendency.

In the exterior sector in particular, good mechanical properties are necessary in order to bridge the structural cracks that appear in the coating over the course of time. In order to achieve this, it is common to use binders whose base resins have very low glass transition temperatures (from −20° C. to −50° C.). Because of these extremely low Tgs, the binders possess very good low-temperature elasticity. On the other hand, the surface of these coatings as a result is naturally very soft and tacky and exhibits an increased tendency to attract dirt, which is a great disadvantage in particular in regions with adverse weather conditions. For this end use, therefore, the prior art recommends post-reactive systems, which crosslink by initiation with sunlight (UV radiation), cure superficially, and so become resistant to soiling.

EP-A 499835 (U.S. Pat. No. 5,314,936) and DE-A 4318083 disclose binder compositions for coating materials, comprising carbonyl- or amido-functional, emulsifier-stabilized copolymers and aromatic ketones for their UV crosslinking. EP-A 441221 relates to UV-crosslinkable aqueous coating materials based on an emulsifier-stabilized acrylate and/or vinyl ester polymer dispersion and aromatic ketones for preventing efflorescence phenomena on mineral substrates. Non-tacky, non-soiling, flexible coatings based on an (meth)acrylate polymer dispersion and water-soluble zinc-amine complexes are known from EP-A 324416 (U.S. Pat No. 4,980,411).

EP-A 565093 describes graft copolymers formed from siloxane and acrylate monomer, which exhibit good extension and a low soiling tendency owing to the silicone component. The crosslinking of the coating material is accelerated by the condensation catalyst fraction. EP-A 421787 discloses coating materials for producing elastic coatings, these materials consisting of two incompatible polymers of which one has N-methylolacrylamide units. Nothing is said about the tendency toward soiling prior to UV exposure.

EP-A 522789 discloses aqueous dispersions for preparing elastic coatings, obtained by first polymerizing a relatively soft polymer and then polymerizing a relatively hard polymer. The resulting core-shell polymer dispersions are equipped with photosensitizers for UV crosslinking, and the soiling tendency of the resultant coatings is investigated before and after UV irradiation.

EP-A 602763 relates to UV-crosslinkable coating materials based on 2-stage polymers, the first stage comprising polymers with polyethylenically unsaturated monomers and the second stage constituting an acid-functional polymer which can be crosslinked after neutralization with epoxy.

A disadvantage of all of the systems referred to is that, despite the fact that following UV irradiation, i.e., in sunlight, they lead to relatively soiling-resistant coatings, without UV irradiation they are extremely susceptible to soiling. Especially in the case of facing coatings in shady areas, or on weathering, the soft coatings remain uncrosslinked and so susceptible to soiling. In rainy weather prior to or following the application of said systems, moreover, there is also a risk of the photoinitiator being washed out, which results in a great reduction in the UV sensitivity and, ultimately, in unsatisfactory crosslinking and soiling resistance of the coatings.

It is therefore an object of the present invention to provide binders, especially for elastic coatings, which are resistant to soiling on their surface both in the dark and following UV radiation but which nevertheless have good low-temperature elasticity.

SUMMARY OF THE INVENTION

The invention provides a process for preparing crosslinkable binders in the form of their aqueous dispersions by polymerizing vinyl ester-olefin copolymers in the presence of protective colloid, which comprises polymerizing vinyl ester-olefin copolymers having a Tg of less than −10° C. by emulsion polymerization in the presence of a protective colloid based on (meth)acrylate polymers comprising from 80 to 95% by weight, based on the overall weight of the polymer, of acrylates or methacrylates of aliphatic alcohols of 1 to 12 carbon atoms and from 5 to 20% by weight, based on the overall weight of the copolymer, of ethylenically unsaturated monocarboxylic or dicarboxylic acids, said latter copolymer having a glass transition temperature Tg of from 60 to 120° C., and, after the end of polymerization, introducing the crosslinkable groups by reacting the carboxyl groups of the (meth)acrylate polymers with ethylenically unsaturated compounds comprising functions suitable for esterifying the carboxyl group.

DESCRIPTION OF THE PREFERRED EMBODIMENTS

Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids of 5 to 11 carbon atoms, examples being VeoVa9®, VeoVa10[10], and VeoVa11® (tradenames of Shell). Vinyl acetate is particularly preferred. Suitable olefinic copolymers are ethylene or propylene, preferably ethylene. Preference is also given to copolymers in which vinyl acetate and ethylene are copolymerized together with from 1 to 30% by weight of other vinyl esters, examples being vinyl 2-ethylhexanoate, vinyl laurate, 1-methylvinyl acetate, vinyl pivalate, and vinyl esters of alpha-branched monocarboxylic acids of 5 to 11 carbon atoms.

The proportions of vinyl ester monomer and olefin monomer are chosen so that the glass transition temperature Tg of the resultant copolymer is less than −10° C., preferably from −50° C. to −20° C. The Tg can be calculated approximately in advance using the Fox equation. According to Fox T. G., Bull. Am. Physics Soc. 1, 3, page 123 (1956), it holds that: $1/T_g = x_1/T_{g1} + x_2/T_{g2} + \ldots + x_n/T_{gn}$, where $x_n$ is the mass fraction (% by weight/100) of the monomer n and $Tg_n$ is the glass transition temperature, in degrees Kelvin, of the homopolymer of the monomer n. Tgs of homopolymers are listed in Polymer Handbook, 3rd Edition, J. Wiley & Sons, New York (1989).

If desired, it is also possible to copolymerize from 0.05 to 10.0% by weight, based on the overall weight of the monomers, of auxiliary monomers from the group consisting of ethylenically unsaturated monocarboxylic and dicarboxylic acids and their amides, such as acrylic acid, methacrylic acid, maleic acid, fumaric acid, itaconic acid, acrylamide, and methacrylamide; ethylenically unsaturated sulfonic acids and their salts, preferably vinylsulfonic acid and 2-acrylamidopropanesulfonate, and N-vinylpyrrolidone. The percentages by weight here always relate to the overall weight of the vinyl ester-ethylene copolymer and add up in each case to 100%.

Suitable protective colloids are those based on (meth) acrylate polymers with from 80 to 95% by weight, based on the overall weight of the copolymer, of units of acrylates or methacrylates of aliphatic alcohols of 1 to 12 carbon atoms and from 5 to 20% by weight, based on the overall weight of the copolymer, of units of ethylenically unsaturated monocarboxylic or dicarboxylic acids, said copolymer having a glass transition temperature Tg of from 60 to 120° C. and a Fikentscher K value of from 20 to 50.

Preferred (meth)acrylates for the protective colloid are methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, and 2-ethylhexyl acrylate. Particular preference is given to methyl acrylate, methyl methacrylate, n-butyl acrylate, and 2-ethylhexyl acrylate.

Preferred ethylenically unsaturated carboxylic acids are acrylic acid, methacrylic acid, maleic acid, fumaric acid, and itaconic acid.

If desired it is also possible to copolymerize from 0.05 to 10.0% by weight, based on the overall weight of the monomers, of auxiliary monomers from the group consisting of ethylenically unsaturated carboxamides, such as acrylamide or methacrylamide, ethylenically unsaturated sulfonic acids and their salts, preferably vinylsulfonic acid and 2-acryl-amidopropanesulfonate, hydroxy-functional comonomers such as hydroxyethyl acrylate, and N-vinylpyrrolidone.

The most preferred copolymers are those of methyl methacrylate, butyl acrylate and methacrylic acid and/or acrylic acid.

The polymer composition of the protective colloid is chosen so as to give a glass transition temperature Tg of from 60 to 120° C. Preference is given to protective colloids having a Tg from 60 to 90° C. The glass transition temperature Tg of the polymers can be calculated approximately in advance using the Fox equation. According to Fox T. G., Bull. Am. Physics Soc. 1, 3, page 123 (1956), it holds that: $1/Tg=x_1/Tg_1+x_2/Tg_2+\ldots+x_n/Tg_n$, where $x_n$ is the mass fraction (% by weight/100) of the monomer n and $Tg_n$ is the glass transition temperature, in degrees Kelvin, of the homopolymer of the monomer n. Tgs of homopolymers are listed in Polymer Handbook, 3rd Edition, J. Wiley & Sons, New York (1989).

The K value of the protective colloids is from 20 to 50, preferably from 30 to 40, determined in analogy to DIN 53726 in 1% strength solution of tetrahydrofuran in water. The K value and Tg of the polymers are matched in such a way that the protective colloid does not dissolve completely even under polymerization conditions, at elevated temperature (from 30 to 80° C.) and at a pH of 7; in other words, the solubility in water under these conditions is not more than 10% by weight of the amount of protective colloid employed.

The crosslinkable groups of the protective colloids are obtained by polymer-analogous reaction of the carboxyl groups with ethylenically unsaturated compounds which are suitable for esterifying the carboxyl group and which, in addition, have an ethylenically unsaturated double bond, for the purpose of crosslinking by subsequent polymerization on UV irradiation.

Suitable examples are epoxy-functional, ethylenically unsaturated compounds, examples being monoethylenically unsaturated monoepoxides such as glycidyl acrylate, glycidyl methacrylate, glycidyl vinyl ether, and glycidyl allyl ether. Also suitable are monoethylenically unsaturated isocyanates such as allyl isocyanates and styrene derivatives having an isocyanate group. These compounds are preferably employed in a molar ratio to the carboxyl groups of the protective colloid of from 1:1 to 1:2 in order to esterify as close as possible to 100% of the carboxyl groups.

The copolymer used as protective colloid is prepared by known methods of emulsion polymerization at a low pH of from about 2 to 4. The protective colloid can either be isolated as a dispersion or else can be polymerized in a first stage followed directly, in the same reaction vessel, by the emulsion polymerization of the vinyl ester-olefin polymer.

The proportion of protective colloid is from 5 to 20% by weight, preferably from 8 to 15% by weight, based on the overall weight of the comonomers of the vinyl ester-olefin copolymer.

The vinyl ester-olefin polymers are prepared by the emulsion polymerization technique in pressure reactors within a temperature range from 30 to 80° C. and at a pressure of from 5 to 85 $bar_{abs.}$ with initiation by the methods commonly employed for emulsion polymerization. Initiation takes place by means of the customary, at least partly water-soluble free-radical initiators, which are employed preferably in amounts of from 0.01 to 3.0% by weight based on the overall weight of the monomers. Examples of such initiators are sodium persulfate, hydrogen peroxide, t-butyl peroxide, t-butyl hydroperoxide; potassium peroxodiphosphate, and azobisisobutyronitrile. If desired, said free-radical initiators can also be combined in a known manner with from 0.01 to 0.5% by weight, based on the overall weight of the monomers, of reducing agents. Suitable examples are alkali metal formaldehyde-sulfoxylates, and ascorbic acid. In the case of redox initiation, one or both redox catalyst components are preferably metered in during the polymerization.

In addition to the protective colloid component it is also possible if desired to employ from 1 to 10% by weight of emulsifier, based on the weight of the vinyl ester polymer, during the polymerization. Suitable emulsifiers include anionic, cationic and nonionic emulsifiers. Examples of suitable emulsifiers are anionic surfactants, such as alkyl sulfates with a chain length of 8 to 18 carbon atoms, alkyl and alkylaryl ether sulfates with 8 to 18 carbon atoms in the hydrophobic radical and up to 40 ethylene oxide or propylene oxide units, alkyl- or alkylarylsulfonates of 8 to 18 carbon atoms, and esters and monoesters of sulfosuccinic acid with monohydric alcohols or alkylphenols. Examples of suitable nonionic surfactants are alkyl polyglycol ethers or alkylaryl polyglycol ethers with from 8 to 40 ethylene oxide units.

The polymerization can be conducted in a batchwise, semibatch, metered or else continuous procedure. Preference is given to the metering technique, in which the major portion of the monomers is supplied continuously. The protective colloid components may all be included in the initial charge or may all be metered in, and a combination of initial charge and metering is also possible. Preferably, all of the protective colloid is included in the initial charge. During the polymerization a pH of from 5 to 7.5, preferably from 6.5 to 7.5, is established.

The functionalization of the protective colloids with the crosslinkable groups takes place after the end of the polymerization of the vinyl ester-olefin polymer, by adding the functional, ethylenically unsaturated compounds in an amount of preferably from 100 to 200 mol %, based on the carboxylic acid units in the protective colloid, with dispersion and subsequent stirring at temperatures of preferably from 20 to 60° C. If desired, functionalization can be accelerated by adding a catalyst from the group consisting of triphenylphosphonium halides and quaternary ammonium compounds. Examples are methyl-, ethyl-, propyl- and butyl-triphenylphosphonium bromide. Also suitable are triphenylphosphonium halides with a substituted alkyl radical, such as 2-carboxyethyl-, 3-bromopropyl- or formylmethyl-triphenylphosphonium bromide. Suitable quaternary ammonium compounds are tetrabutylammonium, benzyltrimethylammonium and methyltributylammonium salts.

The aqueous dispersions obtainable with the process of the invention have a solids content of from 30 to 75% by weight, preferably from 40 to 65% by weight. The dispersions are suitable for use as binders—in architectural chemical products, for example—in conjunction with inorganic, hydraulically setting binders such as cement, gypsum, and silicate. They are also suitable as binders for coating materials, such as paints, and for adhesives, and as coating materials or binders for textiles and paper.

Their preferred use is in coating materials for producing elastic coatings. For this purpose, the dispersions are blended with the customary additives in formulations known to the person skilled in the art. Customary additives are fillers such as chalk, pigments such as titanium dioxide or iron oxides, antifoams such as silicone defoamers, thickeners, film-forming auxiliaries and UV photoinitiators, examples being those based on aromatic ketones such as benzophenones. Particular preference is given to their application in the exterior sector, for example, in exterior paints and renders, especially on mineral substrates.

The procedure according to the invention allows access to soft vinyl ester-olefin copolymer binders whose particles, by virtue of the hard protective colloid component, are surrounded by a hard shell which counters soiling, even in the uncrosslinked state, without lessening the low-temperature elasticity. In contrast to this, the procedure according to EP-A 602763 produces particles which, owing to the covalent detachment of the shell to the soft core and owing to the high proportion of the hard shell, are indeed resistant to soiling but do not exhibit satisfactory low-temperature elasticity.

The examples which follow serve to illustrate the invention:

Example 1
(Preparing the protective colloid)

A mixture of 744 kg of water, 425 g of mercaptopropionic acid, 30.4 kg of a 25% strength solution of an ethoxylated and sulfated fatty alcohol, 12.8 kg of methacrylic acid, 82.9 kg of methyl methacrylate and 10.6 kg of butyl acrylate was heated to 80° C. An initial emulsion consisting of 1490 kg of water, 8 kg of mercaptopropionic acid, 231 kg of a 35% strength solution of an ethoxylated and sulfated nonylphenol having 25 EO units, 157 kg of methacrylic acid, 1650 kg of methyl methacrylate and 208 kg of butyl acrylate was metered into this mixture continuously over 4 hours. In parallel but over the course of 5 hours, a solution of 7.7 kg of ammonium persulfate and 172 kg of water was metered in. After the end of metering, the mixture was stirred at 80° C. for a further hour and then cooled. This gave a dispersion having a solids content of 44%, a pH of 2.8, a particle size of 130 nm, a Tg of 80° C., and a K value of 33.

Example 2
(Preparing the vinyl ester polymer)

A mixture of 2170 g of water and 1460 g of the protective colloid from Example 1 was heated to 55° C. A mixture of 3110 g of vinyl acetate and 1580 g of VeoVa®11 was metered into this mixture continuously over the course of 4 hours. There was parallel metered addition, over the course of 4 hours, of a solution of 1540 g of water, 573 g of a 20% strength solution of dihexyl sulfosuccinate, 67 g of a 40% strength solution of an ethoxylated $C_{12}$–$C_{15}$ fatty alcohol having 15 ethylene oxide units, and, over the course of 5 hours, of a solution of 58 g of t-butyl hydroperoxide in 402 g of water and a solution of 38 g of hydroxymethanesulfinate in 720 g of water. The pH was held at about 7.5 with ammonia. After the end of metering, the mixture was stirred at 55° C. for a further hour and then cooled. The remaining ethylene was let off and the dispersion was freed from residual monomer by adding 30 g of a 10% strength solution of t-butyl hydroperoxide and 60 g of a 5% strength solution of hydroxymethanesulfinate. This gave a dispersion having a solids content of 56.6%, pH of 7.9, a particle size Dw of 250 nm, a Tg of −35° C., and a viscosity of 8200 mPas.

1 g of glycidyl methacrylate and 50 mg of tributylmethylammonium chloride were added to 1000 g of the resultant dispersion, and the mixture was stirred at 50° C. for 2 hours. The resultant dispersion was employed in the performance test.

Comparative Example 1

For comparison, a commercially available aqueous dispersion of a styrene-butyl acrylate copolymer with a Tg of −30° C. and a photoinitiator based on aromatic ketones was employed in the performance test.

Performance Testing

The dispersions from Example 2 and from the Comparative Example 1 were used to prepare an exterior paint having a pigment volume concentration (p.v.c.) of 33 in accordance with the formulation below (Table 1).

Determining the Mechanical Strength

The resultant paints were drawn out to films having a dry thickness of about 300 μm. The elongation at break (EB) and tear strength (TS) of these films were determined at +20° C., 0° C., −10° C., and −20° C. The results are collated in Table 2.

Determining the Dirt Pickup Tendency

The films were subjected to different storage conditions: a) dark storage: storage at room temperature under standard climatic conditions without UV exposure; b) UV storage: 14 days of UV irradiation The dirt pickup tendency of the films stored under these conditions was determined as follows: fly ash was scattered onto the films through a sieve. Following an exposure phase of 30 minutes, the fly ash was carefully tapped off and the degree of soiling was evaluated visually using a rating scale from 0 (no soiling) to 5 (extreme soiling). The results are set out in Table 2.

The results of measuring the elongation at break demonstrate the markedly better elasticity of the coating films when the binders of the invention are used. The results relating to the determination of the dirt pickup tendency show that, when the binders of the invention are used, even after dark storage, there is no soiling of the coating films. In contrast, prior art binders without UV crosslinking become severely soiled.

TABLE 1

| Substance | Amount [g] |
|---|---|
| Water | 65.4 |
| Dispex N40 | 3 |
| NaOH 10% | 3 |
| Hydrol W | 2 |
| Kronos 2190 | 20 |
| Violet pigment | 340 |
| Agitan 281 | 3 |
| Binder 57% | 507.9 |
| Irgacure 651 | 35.7 |

TABLE 2

| Binder | | Ex. 2 | Comp. Ex. 1 |
|---|---|---|---|
| EB/TS + 20° C. | [%/Nmm$^{-2}$] | 206/1.1 | 185/1.9 |
| EB/TS 0° C. | [%/Nmm$^{-2}$] | 340/4.6 | 213/5.8 |
| EB/TS −10° C. | [%/Nmm$^{-2}$] | 238/7.7 | 147/7.5 |
| EB/TS −20° C. | [%/Nmm$^{-2}$] | 89/11.5 | 97/10.5 |
| Soiling, dark storage | | 0–1 | 4 |
| Soiling, UV storage | | 0–1 | 0–1 |

What is claimed is:

1. A process for preparing crosslinkable binders in the form of the aqueous dispersions by polymerizing vinyl ester-olefin copolymers in the presence of protective colloid, which comprises polymerizing vinyl ester-olefin copolymers having a Tg of less than −10° C. by emulsion polymerization in the presence of a protective colloid based on (meth)acrylate polymers comprising from 80 to 95% by weight, based on the overall weight of the polymer, of acrylates or methacrylates of aliphatic alcohols of 1 to 12 carbon atoms and from 5 to 20% by weight, based on the overall weight of the copolymer, of ethylenically unsaturated monocarboxylic or dicarboxylic acids, said latter copolymer having a glass transition temperature Tg of from 60 to 120° C., and, after the end of polymerization, introducing the crosslinkable groups by reacting the carboxyl groups of the (meth)acrylate polymers with ethylenically unsaturated compounds comprising functions suitable for esterifying the carboxyl group.

2. The process as claimed in claim 1, wherein vinyl acetate and ethylene are copolymerized.

3. The process as claimed in claim 1, wherein the protective colloid is employed in an amount of from 5 to 20% by weight, based on the overall weight of the comonomers.

4. The process as claimed in claim 1, wherein a copolymer of methyl methacrylate, butyl acrylate and ethacrylic acid is employed as protective colloid.

5. The process as claimed in claim 1, wherein monoethylenically unsaturated monoepoxides or monoethylenically unsaturated isocyanates are employed for reacting the carboxyl groups of the (meth)acrylate polymers.

6. The process as claimed in claim 1, wherein the ethylenically unsaturated compounds are employed in a molar ratio to the carboxyl groups of the protective colloid of from 1:1 to 1:2.

7. A formulation selected from the group consisting of binders, adhesives and coating materials wherein the formulation contains the product of the process of claim 1.

8. Architectural chemical products containing the formulation of claim 7 as a binder.

9. The architectural chemical products of claim 8 which further contains inorganic hydraulically setting binders.

10. A textile or paper containing the formulations of claim 7 as a binder.

11. A coating material for textiles and paper containing the formulation of claim 7 as a binder.

12. The coating material of claim 10 which is an elastic coating material.

13. An adhesive containing the formulation of claim 7 as a binder.

* * * * *